Sept. 4, 1962  H. E. BRANKER  3,052,817
METHOD OF AND MEANS FOR ENERGIZING
SPARK-MACHINING APPARATUS
Filed March 19, 1958
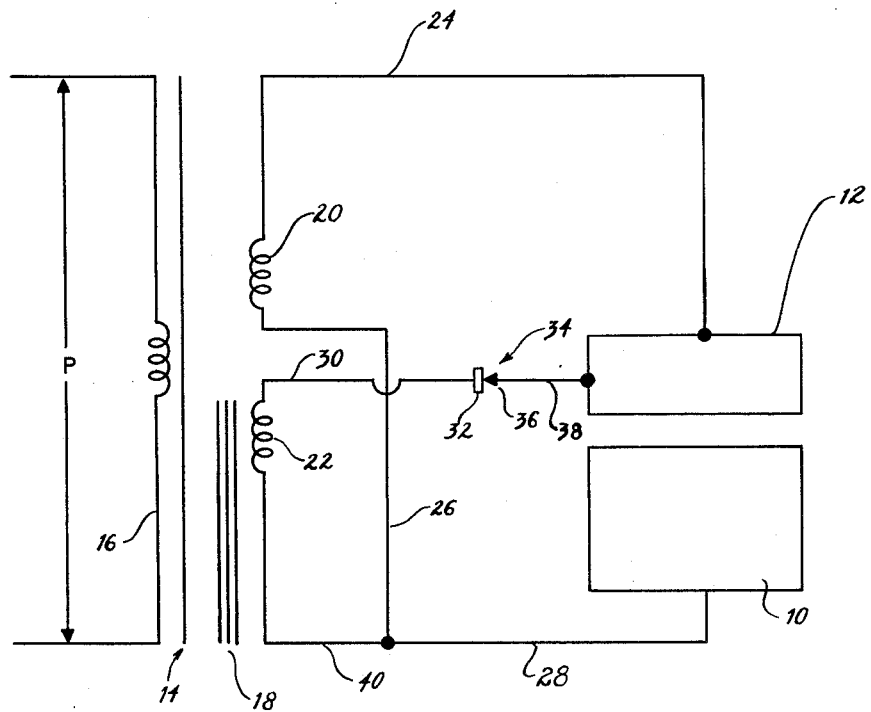
INVENTOR.
HOFFMAN E. BRANKER
BY Franz O. Ohlson, Jr.
ATTORNEY United States Patent Office 3,052,817
Patented Sept. 4, 1962

3,052,817
METHOD OF AND MEANS FOR ENERGIZING SPARK-MACHINING APPARATUS
Hoffman E. Branker, Merrick, N.Y., assignor to Republic Aviation Corporation, Farmingdale, N.Y., a corporation of Delaware
Filed Mar. 19, 1958, Ser. No. 722,454
3 Claims. (Cl. 315—171)

This invention relates in general to the machining of metals and other conductive materials by the utilization of spark discharges between and electrode tool and a workpiece to be machined thereby and, more specifically, to a novel and improved method and apparatus for applying electric energy between the electrode tool and the workpiece to effect the machining process.

In electrical discharge or spark machining, the electrode tool and the workpiece to be machine, or formed thereby, are associated with an electrical circuit including a source of electrical enregy or power whereby when they are positioned in predetermined spaced relationship an electrical discharge or arc may be produced across the gap therebetween that removes a portion of the metal of the workpiece, thereby machining or forming it. The space or gap between the electrode tool and the workpiece is generally occupied by a dielectric medium such as the atmosphere, or any other suitable dielectric fluid, and the electrical arc must pass through this medium. To accomplish this, the electrical arc must ionize a path through the medium between the electrode tool and the workpiece. In the art, this is known as ionizing the gap.

The gap may be ionized by low electrical power having the characteristics of high voltage and low current or amperage, whereas the removal of metal from the workpiece requires relatively high power having low voltage and high current or amperage characteristics. Therefore, one of the problems posed in electrical discharge machining is to provide power in accordance with these demands with a minimum attendant loss of power. In short, the power supply should be capable of delivering sequentially low power at high voltage and low current for ionization of the gap and high power at low voltage and high current for machining or removing the metal of the workpiece.

Among other objects, the present invention contemplates an electrical power supply embodying means for supplying power in accordance with predetermined demands and with minimum power loss.

Thus, as applied to electrical discharge machining or forming apparatus, the invention contemplated herein provides means whereby the electrode tool and workpiece may be supplied sequentially with low power at a high voltage for ionizing the gap and high power at a low voltage and high current for removing metal from the workpiece with a minimum attendant loss of power.

The invention further contemplates a novel and improved method for supplying electric energy or power to a pair of spaced electrical elements, as for example, an electrode tool and a workpiece to be machined thereby.

The above and other objects of the invention will become more apparent from the following description and accompanying drawing illustrating a circuit diagram in accordance with one embodiment of the invention.

In the embodiment of the instant invention illustrated in the drawing, 10 designates a workpiece that is to be machined or formed by an electrode tool 12.

As will hereinafter be more fully set forth, electrical power is supplied to the electrode tool 12 and the workpiece 10 by means of a transformer generally designated 14, having a primary winding 16 to which suitable electrical pulses P are applied from any conventional source of energy, as for example, a thyratron, line-type pulser. The characteristics of the primary winding 16 are not critical except that it must be compatible with the selected pulse source P and the winding, together with the magnetic circuit 18, must be designed to handle the quantity of power to be delivered to the tool 12 and workpiece 10.

In accordance with the present invention the transformer 14 is provided with both low- and high-power secondary windings 20 and 22, respectively, which serve to provide the ionizing and metal-removing power to the electrode tool 12 and the workpiece 10.

More particularly, the lower-power winding 20 is a high-voltage winding loosely coupled to the primary winding 16 and designed to deliver a voltage sufficiently high to ionize the medium in the gap between the workpiece 10 and the tool 12. By using a loose coupling for the secondary winding 20, a high impedance is provided a relatively small load will be placed on the primary winding in the event the secondary winding 20 is short-circuited. One side of the low-power secondary winding 20 is connected to the electrode tool 12 by a lead 24, while the other side thereof is connected to the workpiece 10 by leads 26 and 28. In general practice, the voltage of this low-power secondary winding 20 may be of the order of magnitude of of 500 volts, though it is apparent that this voltage will be determined in accordance with the size of the gap between the workpiece 10 and the electrode tool 12 and need only be sufficient to effect ionization of the medium occupying the gap upon the application of a pulse of electrical energy to the primary winding.

In addition to the low-power secondary winding 20, the transformer 14 is also provided with a high-power secondary winding 22 which serves to deliver power at a low voltage and high current for removing metal from the workpiece. The high-power secondary winding 22 is tightly coupled to the primary winding 16 in order to obtain maximum efficiency in the transfer of energy from the primary winding 16. In addition, the high-power secondary winding 22 is of low resistance and utilizes relatively large wire in order to provide the desired amount of power. One terminal of the high-power secondary winding 22 is connected by a lead 30 to the cathode 32 of a half-wave rectifier, the anode 36 of which is connected by a lead 38 to the electrode tool 12. The opposite terminal of the secondary winding 22 is connected by a lead 40 to the lead 28 and thus, to the workpiece 10.

Due to the foregoing construction and arrangement of parts, the low- and high-power secondary windings 20 and 22, respectively, are connected in parallel with each other and individually to the workpiece 10 and the electrode tool 12. However, the half-wave rectifier 34 modifies this electrical arrangement to the end that low-power secondary winding 20 is not short-circuited by the high-power secondary winding 22. Stated differently, the half-wave rectifier 34 serves to prevent circulation of currents between the low- and high-power secondary windings 20 and 22.

Because of the foregoing construction and arrangement when a pulse of electrical energy is delivered from the source P to the primary winding 16, the initial high-voltage power by which the gap is ionized is supplied solely by the lower-power secondary winding 20. Upon ionization of the gap, the voltage drops and stabilizes at a relatively low voltage that is a function of the dimension of the gap and the dielectric medium therein. At this time and through the remainder of the pulse, both the low- and high-power secondary windings 20 and 22, respectively, contribute to the power being supplied to the electrode tool 12 and the workpiece 10. However, the contribution of the low-power secondary winding 20 is negligible so that, in effect, the power supplied for removing the metal of, or machining, the workpiece 10, is principally supplied by the high-power secondary winding 22.

At the end of the pulse, the energy stored in the magnetic field of the leads 38 and 30, the high-power secondary winding 22 and the leads 28 and 40 tend to cause an undesirable reverse current to flow in the gap between the workpiece 10 and the electrode tool 12. The present invention overcomes this problem by providing the half-wave rectifier 34 which serves to prevent this undesired reversal of current. Thus, the half-wave rectifier 34 not only serves to prevent short-circuiting between the low- and high-power secondary windings 20 and 22, respectively, but also to prevent an undesired reversal of current upon the completion of the power pulse.

From the foregoing description, it is evident that the operation of a spark-machining process by this improved method and apparatus provides for the highly efficient utilization of power and greatly simplifies the power generating or supply means. By reason of this improved arrangement of elements and process the low-power secondary winding 20 can be made of relatively fine wire and need only develop sufficient power to initiate or cause ionization of the gap. The high-power secondary winding 22, on the other hand, supplies the power required to do the machining of the workpiece 10. The high-power secondary winding 22, therefore, is arranged to deliver a low voltage at high current and accordingly will occupy relatively small space and not impose complicated insulating problems.

While the invention has been illustrated and described as utilizing a single transformer 14, it is apparent that this may be accomplished by two individual transformers having the primary windings connected in parallel. In this arrangement the secondary winding of one transformer would be a relatively high-impedance, loosely-coupled winding generating at relatively high voltage, while the secondary winding of the other transformer would be a relatively low-voltage, high-current winding for generating power for the actual machining process.

While only certain embodiments of the invention have been illustrated and described, it is apparent that modifications, alterations and changes may be made therein without departing from the true scope and spirit thereof as defined in the appended claims.

What is claimed is:

1. Apparatus for spark machining comprising a pair of spaced electrodes, at least one transformer having a primary winding, a first loosely-coupled secondary winding and second tightly-coupled secondary winding, said primary winding having means for application of unidirectional electrical energy pulses thereto, connections between the first said secondary winding and the spaced electrodes for the ionization of the gap therebetween, connections between the second of said secondary windings and said electrodes for producing a high-current arc discharge, and rectifier means in series with said second secondary winding to provide unidirectional current flow to said electrodes and prevent the flow of current from the first secondary winding to said second secondary winding.

2. Apparatus for spark-machining materials having a machining electrode spaced from the material to be machined comprising a transformer having a primary winding and a pair of secondary windings, means for applying individual unidirectional pulses of energy to said primary winding, one of said secondary windings being loosely coupled with said primary winding and connected to said electrode and workpiece for ionizing the gap therebetween, the other of said secondary windings being tightly coupled to said primary winding and having means connecting it to said electrode and workpiece for producing a high-energy discharge and means interconnected with said other secondary winding to effect unidirectional flow of current from the winding to the electrode and workpiece.

3. Apparatus for spark machining comprising a pair of spaced electrodes, transformer means, a high voltage low current winding and a low voltage high current winding on said transformer means, at least one winding of said transformer means inductively coupled with the first said windings, means for applying unidirectional electrical energy pulses to said inductively coupled winding, connections between said high voltage low current winding and said spaced electrodes for the ionization of the gap therebetween, connections between said low voltage high current winding and said electrodes for producing a high current arc discharge and rectifier means in series with said low voltage high current winding to provide unidirectional current flow to said electrodes and prevent the flow of current from said high voltage low current winding to said low voltage high current winding.

References Cited in the file of this patent

UNITED STATES PATENTS

| | | |
|---|---|---|
| 2,089,860 | Rypinski | Aug. 10, 1937 |
| 2,179,795 | McCurtain | Nov. 14, 1939 |
| 2,450,475 | Hansell | Oct. 5, 1948 |
| 2,472,115 | Mayer | June 7, 1949 |
| 2,506,964 | Martin | May 9, 1950 |
| 2,581,984 | Toulon | Jan. 8, 1952 |
| 2,615,067 | Bridges | Oct. 21, 1952 |
| 2,759,088 | Lincoln | Aug. 14, 1956 |
| 2,763,811 | Williams | Sept. 18, 1956 |
| 2,777,973 | Steele et al. | Jan. 15, 1957 |
| 2,832,008 | Feinberg | Apr. 22, 1958 |
| 2,834,917 | Moignet | May 13, 1958 |
| 2,837,697 | Berger | June 3, 1958 |
| 2,871,411 | Lester | Jan. 27, 1959 |
| 2,908,799 | Cresswell et al. | Oct. 13, 1959 |